(12) United States Patent
Nouvel et al.

(10) Patent No.: US 8,271,186 B2
(45) Date of Patent: Sep. 18, 2012

(54) VIEWING DEVICE FOR AIRCRAFT COMPRISING MEANS OF DISPLAYING TRAJECTORIES OF INTRUDERS PRESENTING A RISK OF COLLISION IN ALL THE SPACE SURROUNDING THE AIRCRAFT

(75) Inventors: Christian Nouvel, Merignac (FR); Corinne Bacabara, Le Haillan (FR); Jean-Noel Perbet, Eysines (FR)

(73) Assignee: Thales, Neuilly-sur-Seine (FR)

( * ) Notice: Subject to any disclaimer, the term of this patent is extended or adjusted under 35 U.S.C. 154(b) by 414 days.

(21) Appl. No.: 12/542,965

(22) Filed: Aug. 18, 2009

(65) Prior Publication Data

US 2010/0060511 A1    Mar. 11, 2010

(30) Foreign Application Priority Data

Sep. 9, 2008    (FR) ...................... 08 04949

(51) Int. Cl.
 *G06F 17/10*    (2006.01)
(52) U.S. Cl. ............... 701/301; 701/3; 701/10; 701/429
(58) Field of Classification Search .................. 701/3, 9, 701/10, 13, 23, 428, 429
See application file for complete search history.

(56) References Cited

U.S. PATENT DOCUMENTS

| | | | |
|---|---|---|---|
| 4,293,857 A | 10/1981 | Baldwin | |
| 7,286,062 B2 * | 10/2007 | Feyereisen et al. | ........... 340/961 |
| 2002/0120391 A1 | 8/2002 | Nehls | |
| 2006/0265109 A1 * | 11/2006 | Canu-Chiesa et al. | ............ 701/3 |

FOREIGN PATENT DOCUMENTS

| | | |
|---|---|---|
| GB | 2373658 A | 9/2002 |
| WO | 2007002917 A | 1/2007 |

OTHER PUBLICATIONS

U.S. Appl. No. 12/547,595, filed Aug. 26, 2009, Corinne Bacabara et al. (Not Yet Published).
U.S. Appl. No. 12/540,920, filed Aug. 13, 2009, Christian Nouvel et al. (Not Yet Published).
U.S. Appl. No. 12/542,114, filed Aug. 17, 2009, Christian Nouvel et al. (Not Yet Published).
U.S. Appl. No. 12/542,008, filed Aug. 17, 2009, Christian Nouvel et al. (Not Yet Published).
The French Search Report.

* cited by examiner

*Primary Examiner* — Gertrude Arthur Jeanglaude
(74) *Attorney, Agent, or Firm* — Lowe, Hauptman, Ham & Berner, LLP

(57) ABSTRACT

A synthetic vision type viewing system SVS for a first aircraft includes at least position sensors of the first aircraft, a traffic detection system for calculating the position and the dangerousness of at least one second aircraft presenting a risk of collision with the first aircraft based on data obtained from sensors or from the TCAS or ADS-B, an electronic computer, a human-machine interface device and a display screen. The computer includes a processing unit configured to process different information obtained from the database, from the sensors and from the interface device. The processing unit is configured to provide the display screen with a synthetic image of the space surrounding the first aircraft and center on the latter. The image includes at least one first symbol of the first aircraft and a second representation of the past and present trajectory of the second aircraft.

10 Claims, 5 Drawing Sheets

US 8,271,186 B2

VIEWING DEVICE FOR AIRCRAFT COMPRISING MEANS OF DISPLAYING TRAJECTORIES OF INTRUDERS PRESENTING A RISK OF COLLISION IN ALL THE SPACE SURROUNDING THE AIRCRAFT

RELATED APPLICATIONS

The present application is based on, and claims priority from, French Application Number 08 04949, filed Sep. 9, 2008, the disclosure is hereby incorporated by reference herein in its entirety.

BACKGROUND OF THE INVENTION

1. Field of the Invention

The general field of the invention is that of anti-collision systems for aircraft and more particularly that of the presentation of anti-collision information.

2. Description of the Prior Art

For an aircraft in flight, it is vital to know very accurately the aircraft that are situated in its immediate environment in order to avoid any risk of collision. This problem is particularly crucial in a certain number of applications where the aircraft are required to fly at low altitude with possibly reduced visibility conditions. Historically, since the years 1960-1970, a solution that is independent of Air Traffic Control has gradually emerged. This solution is known by the acronym TCAS, standing for "Traffic alert and Collision Avoidance System".

Today, a number of TCAS families have been developed and are in use:

- The first generation, called TCAS I supplies only "Traffic Advisory", or TA, type alerts to the proximity of intruders, craft or aircraft presenting a risk to the aircraft. TCAS I is primarily used in general aviation, that is in the light aircraft domain.
- TCAS II supplies on the one hand TA-type alerts to the proximity of intruders and on the other hand conflict resolution by suggesting avoidance manoeuvres to the pilot. The operating mode is called RA, standing for "Resolution Advisory". These avoidance manoeuvres are performed in a vertical plane by a climb or a descent of the craft. It is primarily used in commercial aviation. TCAS II was made mandatory in the 1990's on all aeroplanes.
- TCAS III, still in development, is an improvement on TCAS II enabling in addition a resolution of the conflicts in RA mode in the horizontal plane by left or right turn manoeuvres.

The TCAS information can be presented to the pilot in different ways. As an example, FIG. 1 shows the presentation of intruders on a Navigation Display (ND) type screen. The intruders are presented in a 2D horizontal plane relative to the aircraft 100 in so-called "ROSE" mode, alluding to the French word for compass. The aircraft 100 occupies the centre of the "ROSE" 101 represented by a graduated circle. The shape and the colour of the intruders differ according to their associated degree of danger and according to the TCAS operating mode.

As examples, the aircraft 102 is close, at a relative altitude of 1100 feet under the aircraft 100, the relative altitude being symbolized by the indication "−11". This aircraft is climbing, symbolized by an up-pointing arrow in FIG. 1. It is represented by a solid diamond coloured white or cyan representing a threat in PT (Proximate Traffic) mode. According to the aeronautical conventions, when the diamond is solid, the threat is of PT type, if it is empty, then the threat is of OT type, meaning "Other Traffic".

The aircraft 103 is a threat in RA "Resolution Advisory" mode. It is situated at a relative altitude of 100 feet under the aircraft 100 and climbing. The colour of the square that represents it is red.

The aircraft 104 is an intruder in TA "Traffic Advisory" mode, it is 900 feet above the aircraft 100 and descending. The colour of the circle that represents it is amber.

As can be seen, the interpretation of the information by the pilot is far from immediate, which can prove particularly dangerous in cases of imminent risk of collision.

The new Synthetic Vision Systems SVS currently give the pilots a synthetic representation of the outside world and therefore, a better awareness of the surrounding dangers such as collisions with the ground without loss of control, commonly called CFIT (Controlled Flight Into Terrain). These SVS systems can currently display in 3D a synthetic terrain and the natural or artificial obstacles (buildings, etc.). An improvement on the presentation of the information supplied by the TCAS has been proposed in the Honeywell patent application entitled "Perspective View Conformal Traffic Target Display", published under the international number WO2007/002917A1. FIG. 2 shows an example of representation of the intruders on a screen 200 of PFD (Primary Flight Display) type according to the provisions of this patent application. The intruders are presented in 3D in a conformal manner, that is, positioned in their real placement in the landscape. Additional information is associated with the intruders to assist the pilot in locating their position, above or below a reference altitude and their degree of separation obtained through a variation of the size of the symbols. FIG. 2 shows, in a 3D conformal synthetic view of the terrain 201, the air traffic. This view also includes a representation 210 of the PFD information. Intruders are presented in the sector in front of the aeroplane. The intruders 204 and 205 are represented by squares that are larger or smaller depending on their relative distance to the aeroplane. Other symbols are added to assist the pilot in interpreting the relative altitude of the intruder relative to the aeroplane. Thus, the symbols 202 and 203 representative of the vertical masts give the position and the height of the intruders above the ground. This presentation is well suited to airliners which fly relatively at high altitude.

Although the new SVS systems give the pilot a better understanding of the situation of the intruders, in particular their type, their positioning, their behaviour, their performance, and so on, these new systems are inadequate for carrying out missions at low altitude. In practice, intruders are very rare for airliners flying on instruments, which follow pre-established flight plans in strict air corridors and are controlled from the ground with radars by air traffic organizations. However, helicopters or small aeroplanes can fly in large numbers at low altitude, for example, to assist in a rescue of a large number of victims, in the context of a "red" plan or in the context of civil accident prevention missions. These aircraft can arrive from the front on approaching, but also from the rear, be situated just below or just above the aircraft. In this case, the flight is essentially a visual flight, with no established flight plan and/or outside conventional radar coverage. The visibility conditions can be degraded if flying at night, if flying towards the sun, in the presence of smoke for fire missions, and so on. The aircraft also have more dynamic and more varied trajectories (turns, climbs, descents, etc.) than those of airliners.

Given these conditions, it is particularly important for the pilot to clearly understand where the intruders are in relation to himself and mainly their performance characteristics such as approach speed, degree of dangerousness, etc. Among intruders, there are:

Those that arrive from the front on approach, but cannot be seen or are seen too late;

Those that arrive from the rear on approach and that cannot be seen visually;

Those that are just below and/or above and that are invisible to the pilot. This last configuration has already led to a large number of fatal accidents with the pilot choosing to climb and/or descend.

SUMMARY OF THE INVENTION

The aim of the invention is therefore to present all the threats that are located in the space surrounding an aircraft as intuitively as possible in order to render them immediately intelligible to the pilot.

More specifically, the subject of the invention is a synthetic vision type viewing system SVS, for a first aircraft, said system comprising at least position sensors of said first aircraft, an air traffic detection system calculating the position and the dangerousness of at least one second aircraft presenting a risk of collision with said first aircraft based on data obtained from recognition sensors, an electronic computer, a human-machine interface means and a display screen, the computer comprising means of processing different information obtained from the database, from the sensors and from the interface means, said processing means arranged so as to provide the display screen with a synthetic image of the space surrounding the first aircraft and centred on the latter, said image comprising at least one first symbol of the first aircraft and a second representation of the past trajectory of said second aircraft, characterized in that said second representation comprises a set of second symbols representative of the different positions occupied in the space by the second aircraft at different instants of the past.

Advantageously, the second representation comprises a third symbol representing the predictive trajectory of the second aircraft in a near future.

Preferably, the second symbols have simple geometrical shapes and colours defined by aeronautical standards and are represented at different instants separated by time intervals of constant duration.

Furthermore, the synthetic image can include a representation of a protection area situated around the first aircraft, said representation of said protection area changing appearance when the second aircraft is situated inside that area or will penetrate therein.

Advantageously, the representation of the synthetic image of the space surrounding the first aircraft is either a two-dimensional view in the form of a first circle centred on the first aircraft, the protection area being represented by a second circle centred on the first circle; or a three-dimensional view in the form of a first sphere centred on the first aircraft, the protection area being represented by a second sphere centred on the first sphere.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

MORE DETAILED DESCRIPTION

Figure 1:
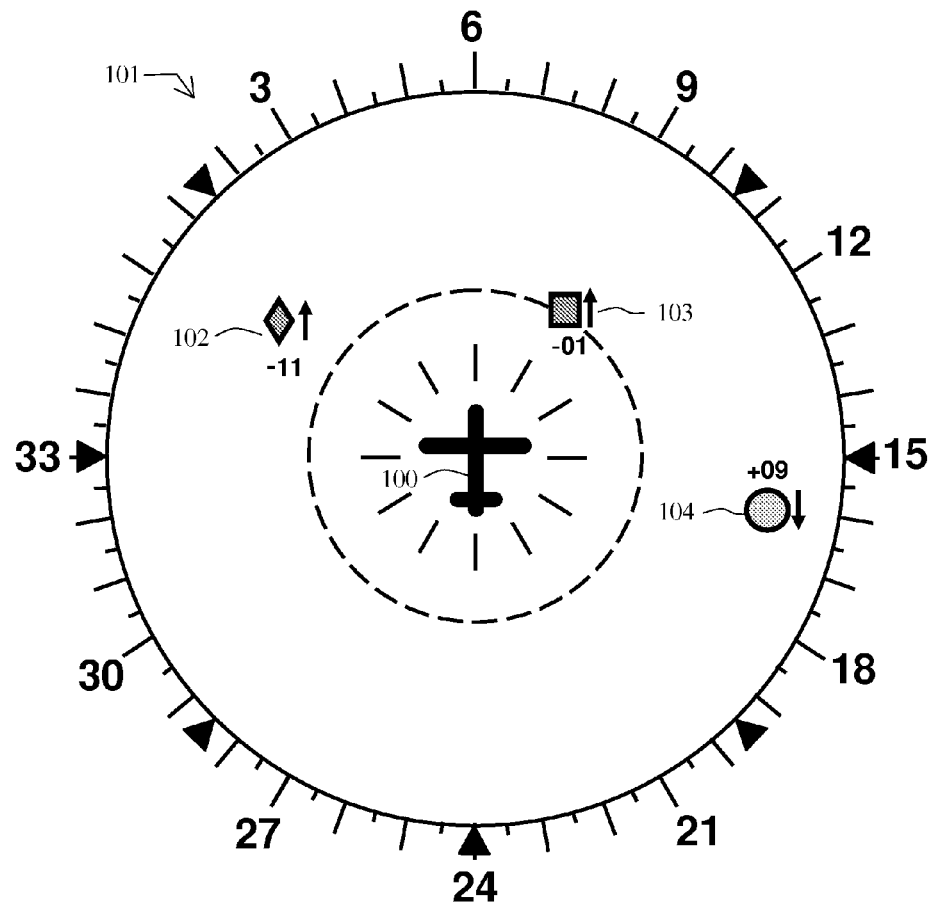
FIG. 1 represents a first presentation of the TCAS-type information according to the prior art.
Figure 2:
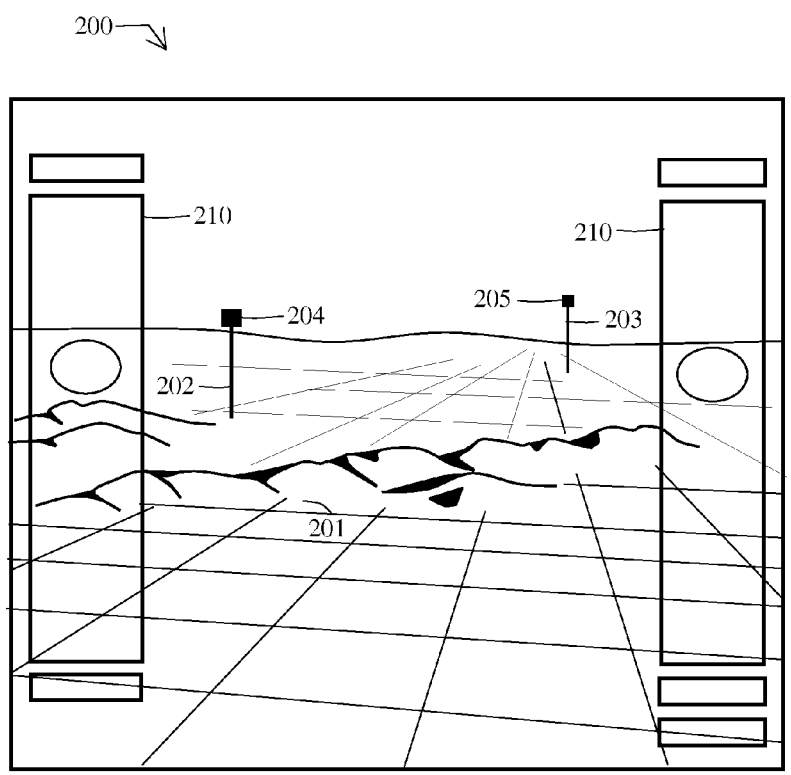
FIG. 2 represents a second presentation of the TCAS-type information according to the prior art.
Figure 3:
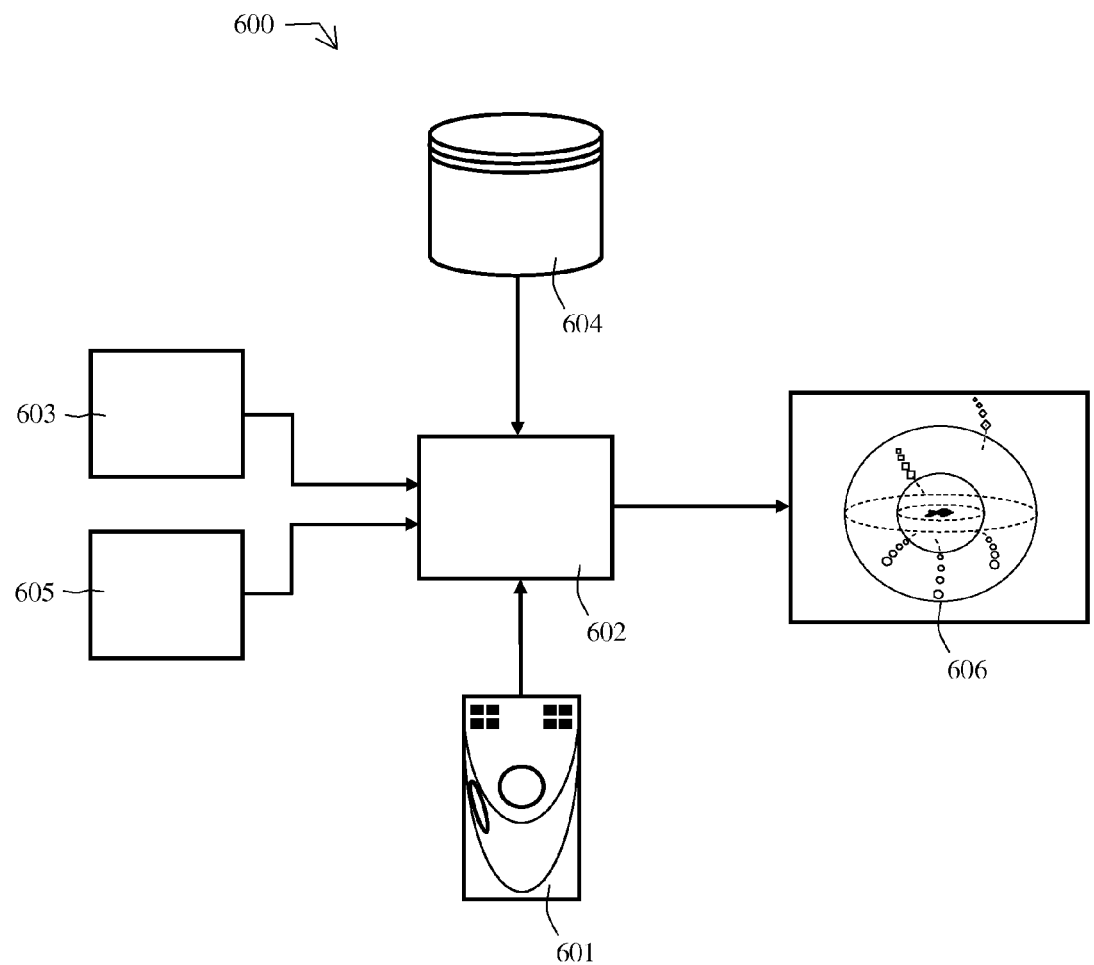
FIG. 3 represents the diagram of a viewing system according to the invention.

FIG. 3 represents an exemplary architecture of the system, the subject of the invention, mounted on a first aircraft. The other aircraft situated in the space close to this first aircraft will be called hereinafter in the description intruding aircraft or more simply intruders.

This exemplary graphic display system 600 includes a processor 602 configured to supply the screen 606 with the information to be displayed. One or more data sources are linked to the processor 602. These data sources include a terrain database 604 used for plotting the perspective view, positioning sensors 603 of the aeroplane, air traffic detection systems, intrusion detectors 605 and control means 601 for the presentation of the information to the pilot.

These databases are generally positioned in the aircraft. The data can also originate from the ground by transmission or "data link" means. Furthermore, these data can be stored on different peripheral devices such as diskettes, hard disks, CD-ROMs, volatile memories, non-volatile memories, RAMs or other means that can be used to store data.

The display system also comprises human-machine interface and control means 601. These means are, for example, as represented in FIG. 3, CCDs (Cursor Control Devices), means similar to a computer "mouse" or conventional control stations, control being applied by the use of knobs, touch surfaces, etc.

The processor 602 is interfaced with hardware components that provide a graphic rendition. For example, these hardware components are one or more microprocessors, memories, storage appliances, interface cards or any other standard components. In addition, the processor 602 works with software or firmware. It is capable of reading machine instructions to perform various tasks, computations and control functions and generate the signals to be displayed and the other data used by the display screen. These instructions can be stored on diskettes, hard disks, CD-ROMs, volatile memories, non-volatile memories, RAMs or any other means that can be used to store data. All these means are known to those skilled in the art.

The processor 602 supplies the data to be displayed to the display screens 606. These data comprise:

The position in latitude/longitude, the speed, the heading, etc. of the aircraft based on the current location of the aircraft obtained from the position sensors 603;

The terrain databases 604;

The relative positions of the intruders supplied by the air traffic detection system 605;

The processor 602 is configured to receive and calculate the aeroplane data, namely the current location of the aircraft obtained from the position sensors 603 which can be an inertial unit, a GPS, etc.

Based on the position data, the processor 602 obtains the terrain data from the terrain database 604. It sends these data to the display screens 606 to represent a synthetic image.

The traffic detection systems 605 comprise at least one TCAS system. They can also be systems of the ADS-B (Automatic Dependent Surveillance Broadcast) or TIS-B (Traffic Information Service Broadcast) type, or a "Traffic Computer" which merge the data obtained from the TCAS or the ADS-B. Optionally, the data can be supplied by a digital link of Datalink type. These traffic detection systems can supply the position of the intruders, the types of the intruders (helicopters, aeroplanes, other), their speed, etc.

The processor 602 is configured to receive the information, check its consistency, store historically, for example, at least the last five positions of each intruder, for example in a timestamped circular queue and predict the future trajectory over a short period. The number of values logged is parameterizable.

Figure 4:
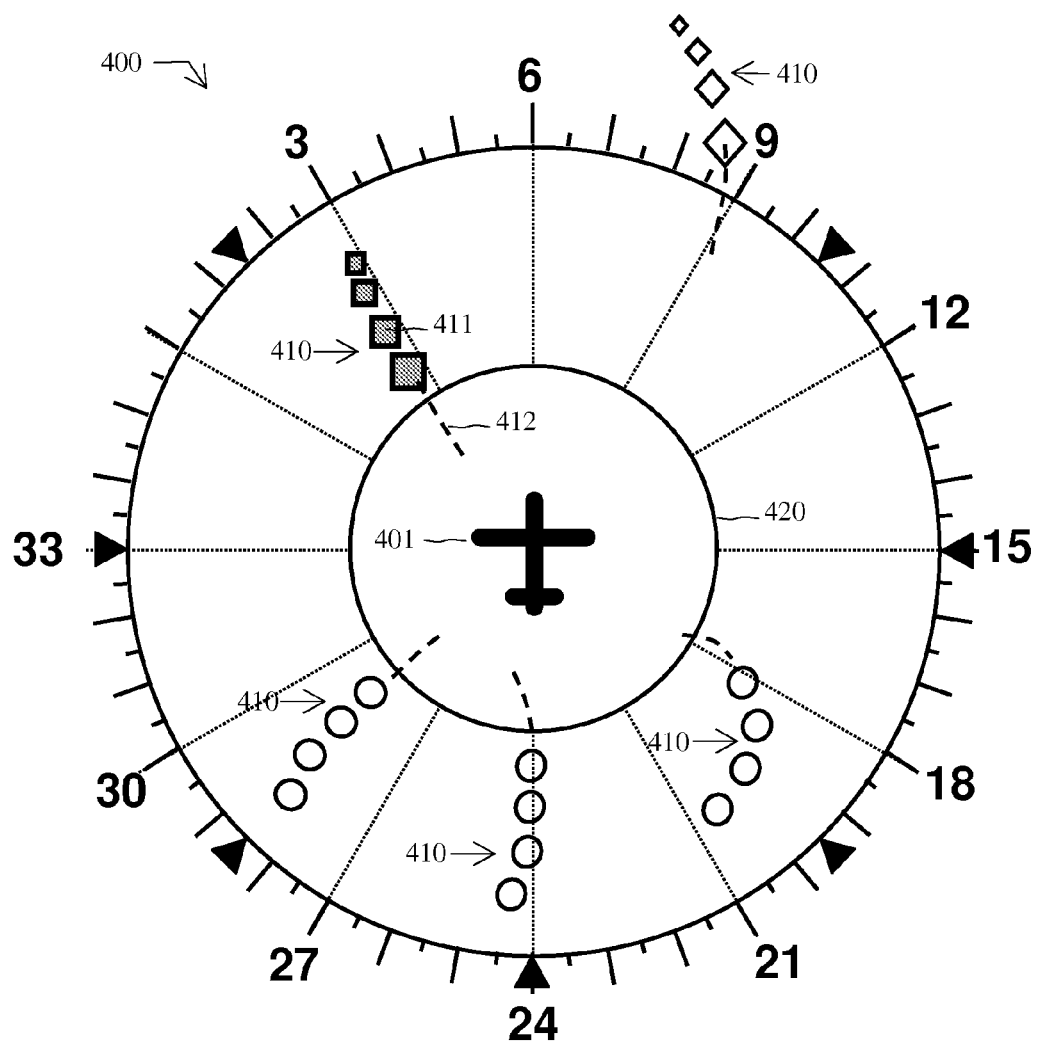
FIG. 4 represents a first overview in a 2D representation of a TCAS-type display according to the invention.
Figure 5:
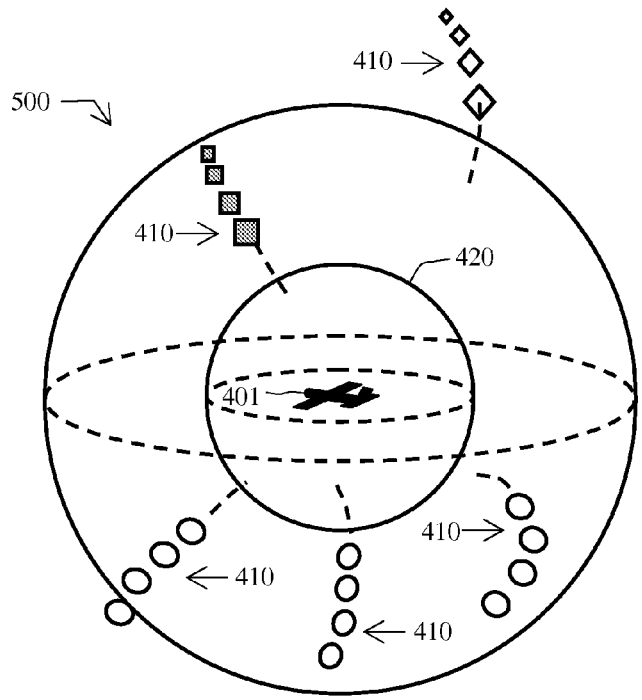
FIGS. 5 and 6 represent two overviews in a 3D representation of a TCAS-type display according to the invention.
Figure 6:
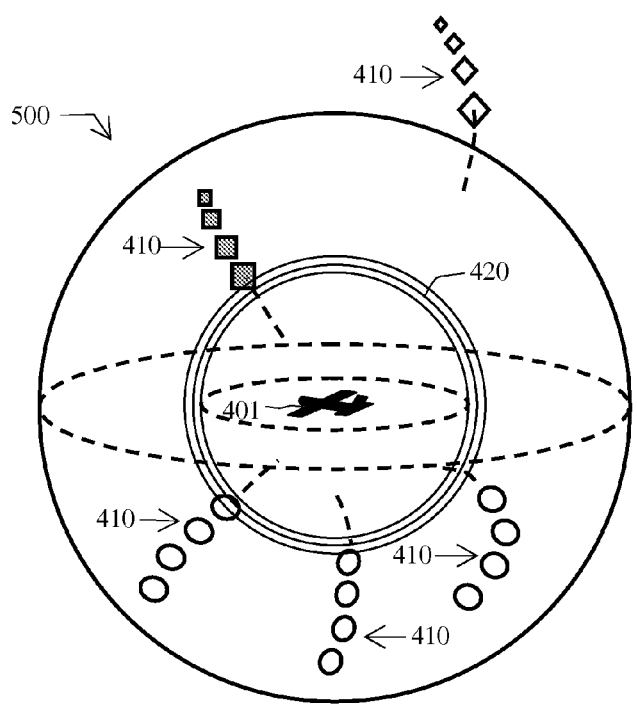

The intruders are presented in a two-dimensional or three-dimensional view as represented in FIGS. 4, 5 and 6 on a navigation screen of ND (Navigation Display) or of HSI (Horizontal Situation Indicator) type. The representations according to the invention make it possible to instantaneously distinguish whether an intruding aircraft is approaching or moving away. Only the intruders present between the aircraft and a certain duration selected either by the pilot or automatically by the computer are represented. This duration is calculated on the basis of the distance of the intruders and their approach speed. The minimum duration set by the pilot cannot be less than 30 seconds.

FIG. 4 presents the intruding aircraft in a two-dimensional synthetic view 400. The image 400 is used to display the graphic view which represents all the intruders detected in a 360-degree sector around the aircraft 401 positioned at the centre of the view. Five intruders are represented in this figure. These intruders are represented historically and predictively. This image is a medium-term strategic type image. It is viewed on a screen of the conventional Navigation Display (ND) type in 2D or of the Horizontal Situation Indicator (HSI) type.

Each intruder 410 consists of two parts: a "history" part represented by a number of symbols 411 and a "predictive" part represented by a symbol 412.

The symbols 411 can be of simple geometrical shapes, standardized by the ICAO (International Civil Aviation Organization): diamonds, circles, squares, the symbolism of which is drawn from the current standards. These shapes can be coloured or not. Thus, in FIG. 4, three of the intruders 410 are represented by a series of four circles (logically TA and therefore in amber), one intruder 410 is represented by a series of four grey squares (the squares are RA, and therefore red) and one intruder 410 is represented by a series of four white (or cyan) diamonds, the diamond being solid or not depending on whether they are PTs or OTs. They can be also be represented by dots of greater or lesser thickness. It is possible to represent them with identical sizes or, on the contrary, these symbols can be of variable size so as to simulate the intruder approaching or moving away from the first aircraft. These different cases are represented in FIG. 4.

For each intruder, the position of the symbols 411 is calculated by the processor 602 in relation to the current position of each intruding aircraft at different instants. The number of symbols 411 displayed is 4 for each intruder in FIG. 4. It could be 3 or 5. The time difference between two consecutive symbols 411 is of the order of 5 seconds. The setting of the maximum number of symbols 411 and/or of the time difference can be determined automatically by the processor 602 or by the pilot by means of the control panel or the CCD 601. The aim is to lighten the image to render it as intelligible as possible to the pilot.

The symbol 412 is represented in our example of FIG. 4 by a dotted line. It can be represented by a more or less thick line. The position of this symbol is calculated by the processor 602 to indicate to the pilot the provisional path to be traveled by the intruder over the next few seconds. The filtering used, for example to predict the behaviour of the intruder, can be of linear type in the interests of simplicity and effectiveness.

The symbol 420 indicates the cylindrical protection area around the aeroplane. This symbol starts to blink in amber if at least one end of a predictive symbol 412 penetrates therein.

FIGS. 5 and 6 represent an image of the present invention according to a 3D representation in a sphere of 4π steradians.

The image 500 is used to display the graphic view which represents all the intruders 410 detected in a volume of 4π steradians centred on the aeroplane 401. These intruders are represented historically and predictively.

This image is of medium-term strategic type. As an example, it is viewed on a Navigation Display (ND) type screen in 3D.

The symbols of the intruders are of the same type as those previously described for FIG. 4.

The symbol 420 indicates the spherical protection area around the aeroplane. This symbol starts to blink in amber if at least one end of a predictive symbol 412 penetrates therein as indicated in FIG. 6 where the blinking is indicated by a series of three concentric circles.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. Synthetic vision type viewing system SVS, for a first aircraft, said viewing system comprising:
    position sensors of said first aircraft,
    an air traffic detection system configured to calculating a position and dangerousness of at least one second aircraft presenting a risk of collision with said first aircraft based on data obtained from recognition sensors,
    an electronic computer,
    a human-machine interface device,
    a database, and
    a display screen,
    wherein
    the computer comprises a processing unit configured to process different information obtained from the database, from the position sensors and from the interface device
    the processing unit is further configured to provide the display screen with a synthetic image of a space surrounding the first aircraft in a 360-degree sector, said image includes
- a first symbol representation representing the first aircraft and centered on the synthetic image,
- a second representation representing a trajectory of said second aircraft and comprising a set of symbols representative of a past trajectory including different positions occupied in the space by the second aircraft at different instants of the past trajectory, and
- a third representation representing a protection area situated around the first aircraft,
- wherein the first representation representing the first aircraft is centered on the third representation representing the protection area in the 360-degree sector.

2. The viewing system according to claim 1, wherein the second representation further comprises a symbol representing a predictive trajectory of the second aircraft in a near future.

3. The viewing system according to claim 1, wherein the symbols of the second representation have geometrical shapes and colors defined by aeronautical standards.

4. The viewing system according to claim 1, wherein the symbols of the second representation are represented at different instants separated by time intervals of constant duration.

5. The viewing system according to claim 1, wherein the third representation of said protection area is configured to change appearance when the second aircraft is situated inside the protection area or will be situated inside the protection area.

6. The viewing system according to claim 1, wherein
the synthetic image that is represented in a three-dimensional view, and includes a first sphere on which the first aircraft is centered, and a second sphere representing the protection area, and
the second sphere is centered on the first sphere.

7. The viewing system according to claim 2, wherein
the synthetic image that is represented in a three-dimensional view, and includes a first sphere on which the first aircraft is centered, and a second sphere representing the protection area, and
the second sphere is centered on the first sphere.

8. The viewing system according to claim 3, wherein
the synthetic image that is represented in a three-dimensional view, and includes a first sphere on which the first aircraft is centered, and a second sphere representing the protection area, and
the second sphere is centered on the first sphere.

9. The viewing system according to claim 4, wherein
the synthetic image that is represented in a three-dimensional view, and includes a first sphere on which the first aircraft is centered, and a second sphere representing the protection area, and
the second sphere is centered on the first sphere.

10. The viewing system according to claim 5, wherein
the synthetic image that is represented in a three-dimensional view, and includes a first sphere on which the first aircraft is centered, and a second sphere representing the protection area, and
the second sphere is centered on the first sphere.

* * * * *